Patented Feb. 3, 1925.

1,525,285

UNITED STATES PATENT OFFICE.

RAFFAELE GABBOLA, OF NEW YORK, N. Y.

COMPOSITION FOR USE AS A SALVE OR OINTMENT.

No Drawing.   Application filed April 24, 1922.   Serial No. 556,354.

*To all whom it may concern:*

Be it known that I, RAFFAELE GABBOLA, a subject of the King of Italy (having declared my intention of becoming a citizen of the United States), residing in the borough of Manhattan, city, county, and State of New York, have invented a new and useful Composition for Use as a Salve or Ointment, of which the following is a specification.

The object of my invention is the production, as an article of manufacture, of an unguent composition of the character designated, in which all danger of burn, blister, scar, harm, or deleterious effect to the surface treated is eliminated; and whereby, at the same time, a maximum of curative efficiency is attained,—the invention consisting essentially in the combination of ingredients, in substantially the proportions named in the accompanying formula, united and blended in the manner hereinafter set forth, or approximately so.

While it is to be understood that I do not confine myself to the exact relative proportions of ingredients named in the following formula, I have found the same practical and conducive of good results: to wit:—

12 whites of eggs, 4 oz. flour, ½ gal. olive oil, 3 lbs. goose fat, 1 grain bicarbonate of soda, 1 grain of salt, 6 oz. water, 6 oz. camphor.

These constitute parts of my composition and may be compounded and blended in the following manner.

Whip the whites of eggs and add thereto the olive oil in luke-warm condition, thoroughly stirring such admixture. Then make a dough of the flour and water, and add same to the mixture of oil and albumin. Then add the bicarbonate of soda, and stir. Finally, stir in the camphor powder, and then place the resultant concoction in jars to cool.

What I claim as my invention and desire to secure by Letters Patent is,

The herein described salve or ointment, composed of egg albumen, flour, olive oil, goose fat, bicarbonate of soda, salt, water and camphor, in substantially the proportions specified, the goose fat and olive oil predominating.

RAFFAELE GABBOLA.

Witnesses:
SAMUEL MAZZOLA,
STANLEY VERUSIO,